United States Patent [19]

Takeda

[11] Patent Number: 4,526,059
[45] Date of Patent: Jul. 2, 1985

[54] PEDAL FOR A BICYCLE

[75] Inventor: Nobumi Takeda, Sakai, Japan

[73] Assignee: Shimano Industrial Company Limited, Osaka, Japan

[21] Appl. No.: 89,353

[22] Filed: Oct. 30, 1979

[30] Foreign Application Priority Data

Nov. 11, 1978 [JP] Japan .................... 53-155526[U]

[51] Int. Cl.³ .............................................. G05G 1/14
[52] U.S. Cl. .................................................. 74/594.4
[58] Field of Search ........................... 74/594.4, 560

[56] References Cited

U.S. PATENT DOCUMENTS 2,542,548  2/1951  Matthias et al. .................. 74/594.4

FOREIGN PATENT DOCUMENTS

| 447480 | 10/1912 | France . | |
| 516494 | 12/1920 | France . | |
| 898289 | 4/1945 | France | 74/594.4 |
| 1113271 | 12/1955 | France . | |
| 1177593 | 6/1957 | France | 74/594.4 |
| 2353431 | 1/1976 | France | 74/594.4 |
| 279819 | 1/1954 | Switzerland | 74/594.4 |
| 17398 | of 1896 | United Kingdom | 74/594.4 |

Primary Examiner—Kenneth J. Dorner
Attorney, Agent, or Firm—Stevens, Davis, Miller & Mosher

[57] ABSTRACT

A pedal for a bicycle, which has a pedal body provided with a pair of first and second foot bearing surfaces and displaced at the center of vertical length of the body lower than the axis of a pedal shaft so that the foot bearing surfaces at the pedal body may face always upward, the pedal body also being forwardly extended at the front side thereof to form an extension having a third foot bearing surface.

3 Claims, 4 Drawing Figures

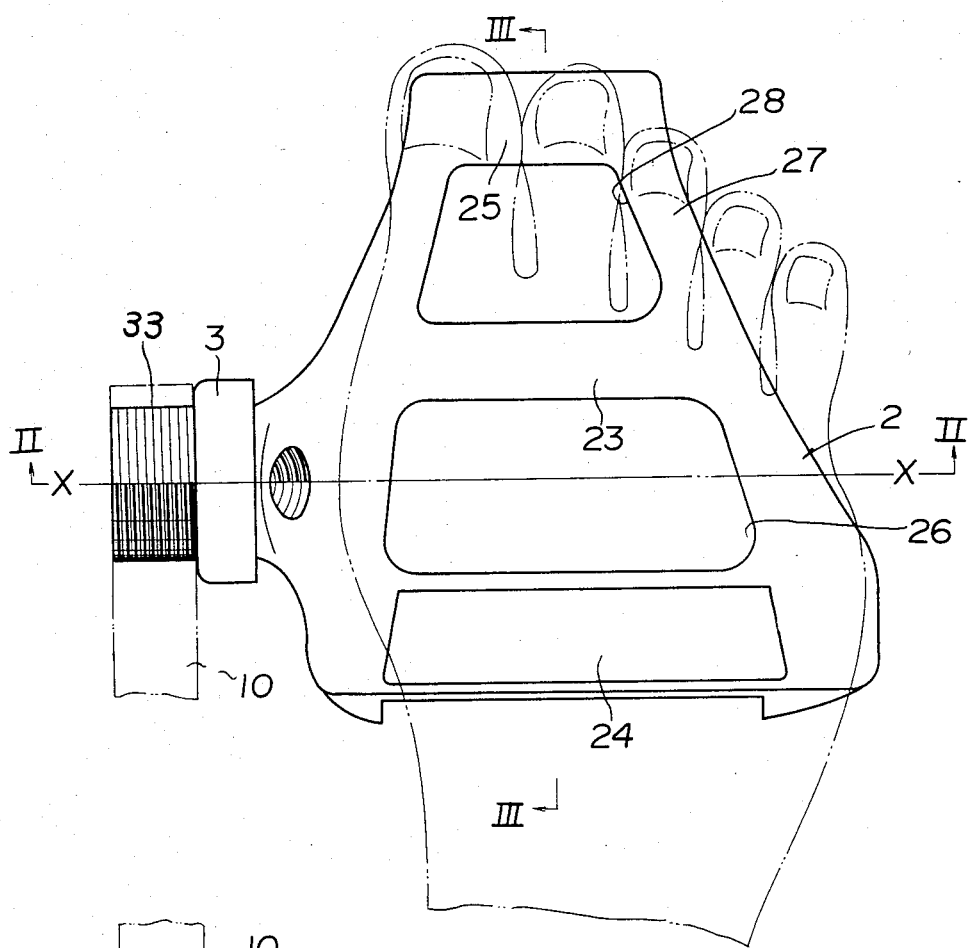
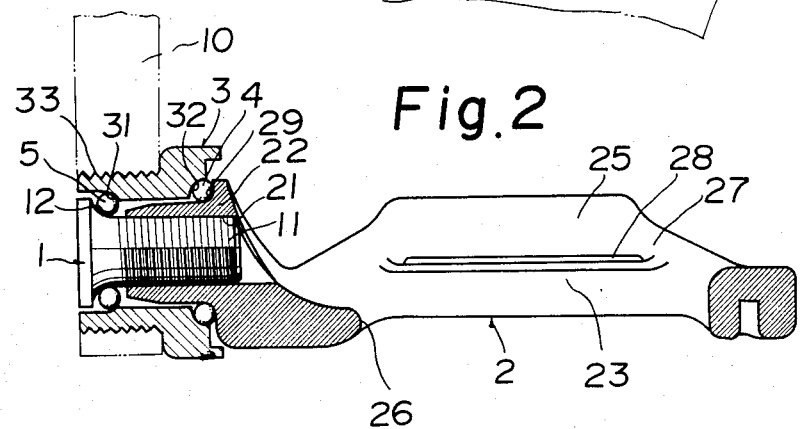

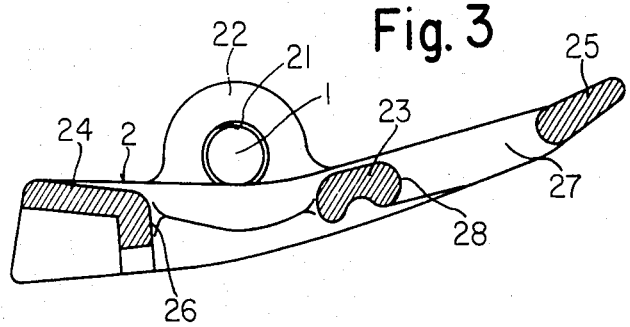
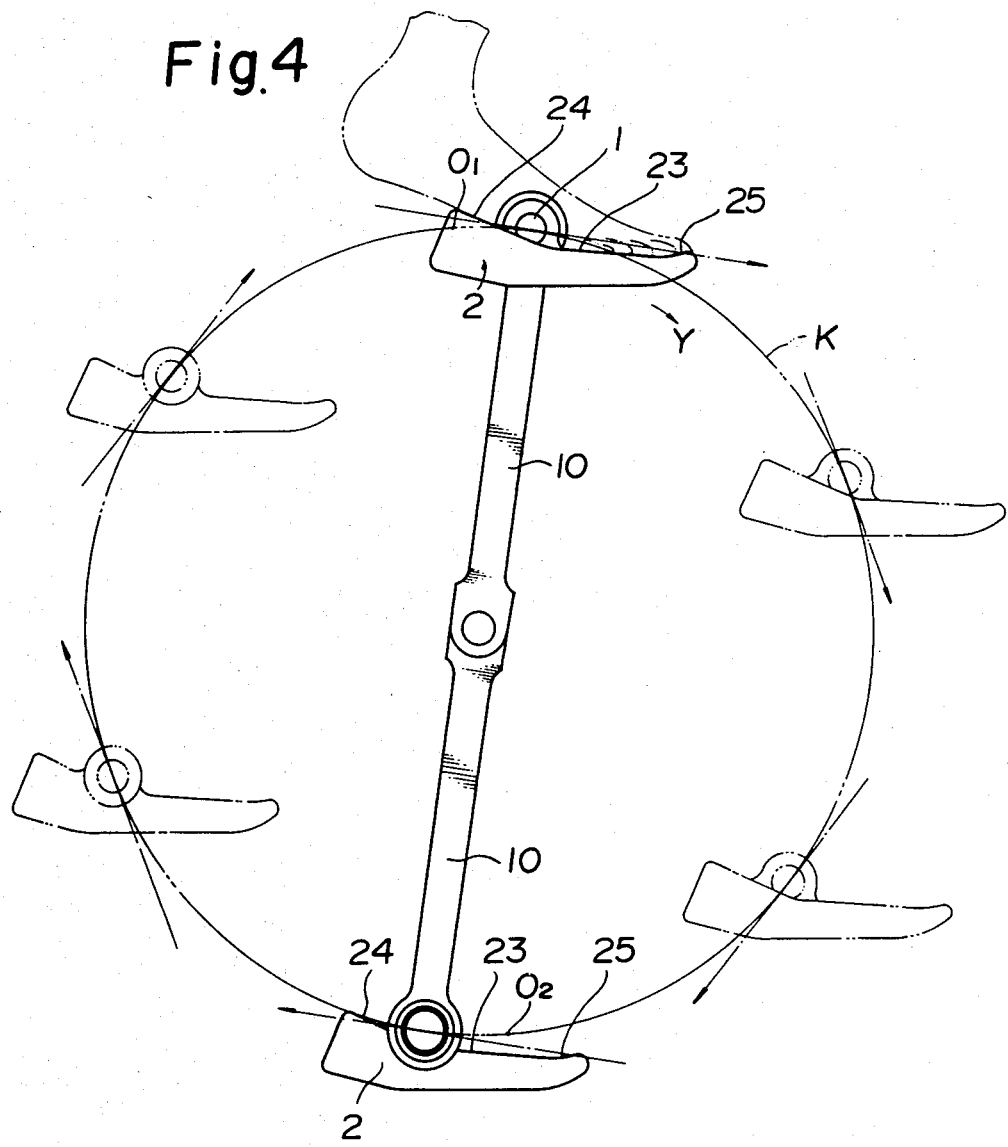

PEDAL FOR A BICYCLE

BACKGROUND OF THE INVENTION

This invention relates to a pedal for a bicycle, and more particularly to a pedal for a bicycle, which comprises a a pedal shaft and a pedal body supported rotatably to a crank arm of the bicycle by way of the pedal shaft, so that a cyclist may transmit his treading force to the crank arm for driving the bicycle.

Generally, this kind of pedal is well-known and has a pair of support plates mounted rotatably through balls to the pedal shaft at a regular interval, and a pair of foot plates provided between the support plates and having foot bearing surfaces respectively, or a pedal body with two first and second foot bearing surfaces mounted to the pedal shaft in relation of being displaced with respect to the axis of pedal shaft and supported thereto in cantilever fashion.

The pair of foot bearing surfaces at the conventional pedal are disposed apart from the axis of pedal body at approximately equal distances, whereby a cyclist, when pedalling the bicycle, puts his foot onto the pedal body, contacting at two front portions of his sole with the foot bearing surfaces, and his toes project out from the front foot bearing surface at the pedal body.

Hence, the cyclist, when pedalling using the conventional pedal, tries to apply the treading force to the pedal, but the treading force is not fully utilized due to his toes projecting beyond the foot bearing surface. As a result, the location of the pedal in rotation may not transmit the treading force effectively to the crank arm.

In detail, it is the most preferable that the cyclist, when pedalling, applies his treading force to the pedal body through the foot bearing surfaces in the direction of the tangent to the rotary path of the pedal shaft axis. The foot bearing surfaces at the pedal are usually slant downwardly at an angle of 10° to 15° with respect to the horizon because of the relation of the posture of cyclist pedalling the bicycle with his foot joints, hip joints, knee joints and ankle joints. Hence, the conventional pedal, which has the two foot bearing surfaces at equal intervals from the axis of pedal shaft, is angled at the treading side slightly ahead of the upper dead point of the crank arm in revolution (ahead in the direction of revolution of crank arm when the bicycle is running forward), such that the treading force acting on the foot bearing surfaces through the axis of pedal body is directed considerably slantwise from the tangent to the rotary path of the pedal body axis, and the cyclist cannot effectively apply the treading force to the pedal.

On the other hand, the cyclist will raise the pedal from the lower dead point of the crank arm in the manner of kicking it backward. Since, the cyclist, when using the conventional pedal, cannot apply his treading force to the pedal by his toes, especially the tip of big toe, it is difficult to raise the pedal by use of his toes.

SUMMARY OF THE INVENTION

A main object of the invention is to provide a pedal capable of effectively utiliziing the treading force by the cyclist regardless of the position of the pedal, reliably transmitting the treading force to the crank without loss, and facilitating the raising the pedal from the lower dead point. Another object of the invention is to provide a pedal whose pedal body is well fit to the cyclist's foot so that he is less tired even when pedalling the bicycle continuously for a long time.

This invention is characterized in that the pedal body is displaced at the center of vertical length i.e., the centroid, lower than the axis of pedal shaft so that a pair of first and second foot bearing surfaces provided at the pedal body may face always upward, and the pedal body is extended at the front side in the forward direction of the bicycle to form an extension having a third foot bearing surface.

In other words, the pedal of the invention is so constructed that the third foot bearing surface bears the cyclist's toes, whereby the treading force therefrom, especially from the tip of his big toe, is utilized for pedalling without loss, and that the treading force is transmitted from the pedal shaft to the pedal body through the foot bearing surfaces in the direction of the tangent to the rotary path of the pedal body axis, thereby being effectively transmitted from the pedal body to the crank.

Furthermore, the third foot bearing surface is provided in addition to the first and second foot bearing surfaces, to bear the cyclist's toes. Hence, the pedal is fit more effectively to the cyclist's foot, and is easily raised from the lower dead point, whereby the cyclist is less tired even when pedalling the bicycle for a long time.

These and other objects and novel features of the invention will be more apparent upon a reading of the following detailed specification and drawings.

BRIEF DESCRIPTION OF THE DRAWINGS

FIG. 1 is a plan view of an embodiment of a pedal of the invention,

FIG. 2 is a sectional view taken on the line II—II of FIG. 1,

FIG. 3 is a sectional view taken in the line III—III in FIG. 1, and

FIG. 4 is a schematic illustration showing condition of using the pedal.

DESCRIPTION OF THE PREFERRED EMBODIMENT

Referring to the drawings, reference numeral 1 designates a pedal shaft. The pedal shaft 1 is provided at the outer periphery of one axial end thereof with a screw thread 11 and at the outer periphery of the other end with a ball race 12.

Reference numeral 2 designates a pedal body screwable with the screw thread 11 at the pedal shaft 1. The pedal body 2 is made of lightweight alloy, such as aluminum, and formed to be thin and flat. At the inside of the pedal body 2 transversely of the bicycle is provided a mounting portion 22 having a threaded bore 21 which is screwed with the screw thread 11 at the pedal shaft 1. With respect to an extension line X—X of the axis of pedal shaft 1, at the front side in the forward direction of the bicycle is provided a first foot bearing surface 23 and at the rear side, a second foot bearing surface 24. The center of vertical thickness or the centroid of the pedal body 2 is displaced radially downwardly with respect to the axis of the pedal shaft 1, so that the pedal body 2, when supported rotatably to a crank arm 10 through the pedal shaft 1, allows the foot bearing surfaces 23 and 24 to face always upward due to the horizonal positioning characteristics of the pedal body 2. A through bore 26 may be provided between the first and second foot bearing surfaces 23 and 24 merely for reducing weight of the pedal body 2. It is not required as both the foot bearing surfaces 23 and 24 may be in continuation of one another.

The pedal body 2 is extended at its front side to form and extension 27 having a third foot bearing surface 25. The third foot bearing surface 25 extend longitudinally of the bicycle to an extent that when a standard size foot is placed onto the first and second foot bearing surfaces, the toes contact with the third foot bearing surface 25. A length between the extension of the axis of pedal shaft 1 and the center line of length of the second foot bearing surface 24 longitudinally of the bicycle and that between the extension of the axis and the center line of length of the third foot bearing surface 25, are in the ration of 1 to 1.3 through 2.0.

As a concrete example, when the length between the extension of the axis of pedal shaft 1 and the rear edge of the second foot bearing surface 24 is 35 mm, the length between the extension of the axis and the front edge of third foot bearing surface 25 is 63 through 75 mm. Therefore, the cyclist can obtain the treading force from his toes, especially from the tip of big toe, due to the provision of the third foot bearing surface 25. Also, when the pedal is positioned slightly ahead of the upper dead point $O_1$ of the crank arm as shown in FIG. 4, that is, slightly at the treading side (in the direction of arrow Y as shown), the cyclist can transmit the treading force from the pedal shaft 1 to the pedal body 2 through the foot bearing surfaces in the direction of the tangent to the rotary path K of the pedal body axis, and also easily raise the pedal from the lower dead point $O_2$ by use of action of his big toe contacting with the third foot bearing surface 25.

In addition, the third foot bearing surface 25 is not defined in position particularly with respect to the axis of pedal shaft 1, but is positioned higher than the first and second ones. As seen in FIG. 3, it is preferable that when the pedal is kept horizontal, the second foot bearing surface 24 is in the lowermost position and slants forward and downwardly, the first foot bearing surface 23 is positioned higher than the second foot bearing surface 24 and slants forward and upwardly, and the third foot bearing surface 25 is slant forward and upwardly continuously in the direction of inclination of the first foot bearing surface 23.

The above construction enables the respective foot bearing surfaces 23 to 25 to reliably fit to the cyclist's foot placed thereon and further ensures transmission of the treading force from the cyclist's toes to the pedal through the third foot bearing surface 25. As a result, the cyclist is less tired even when pedalling the bicycle for a long time.

An opening 28 may be provided between the third foot bearing surface 25 and the first foot bearing surface 23 in order to make the pedal body 2 lightweight. Or, the third foot bearing surface 25 may be a continuation of the first foot bearing surface 23.

A ball race 29 is formed at the outer periphery of the mounting portion 22 at the pedal body 2. A bearing cylinder 3 having ball races 31 and 32 opposite to the ball races 12 and 29 respectively is sleeved onto the pedal shaft 1 and mounting portion 22. Balls 4 and 5 are inserted between the ball race 32 at the bearing cylinder 3 and ball race 29 at the mounting portion 22 and between the ball race 31 at the bearing cylinder 3 and ball race 12 at the pedal shaft 1 respectively, so that the pedal shaft 1 and pedal body 2 are rotatably supported to the bearing cylinder 3, which is screwably fixed to the crank arm 10 through a screw thread 33 formed at the outer periphery of bearing cylinder 3 to be screwed with the threaded bore at the crank arm 10.

The pedal constructed as described, which is connected to the crank arm 10 by way of the bearing cyclinder 3 as shown in FIG. 2, allows the pedal body 2 to keep the foot bearing surfaces 23, 24 and 25 facing always upward due to the horizontal positioning characteristic of the pedal body 2 regardless of the position of crank arm 10 during revolution.

The pedal body 2 having the extension 27 may be formed larger in weight at the front side than the rear side with respect to the line X—X of the extension of the axis of pedal shaft 1. Hence, the pedal body 2, when not supporting a cyclist's foot, is slant forward downwardly with respect to the horizon by an angle of 10 to 15 degrees as shown in FIG. 3. As a result, the cyclist, when pedalling, can fit his slanted foot to the pedal body 2 in its slanting position to thereby easily pedal the bicycle.

Also, the first and second foot bearing surfaces 23 and 24 bear the cyclist's foot at the front portion of sole thereof and the third foot bearing surface 25 contacts with his toes, whereby the cyclist's foot may fit stably to the respective foot bearing surfaces. Under these conditions, the cyclists, when pedalling the bicycle, can apply to the respective foot bearing surfaces 23, 24 and 25 the treading force in the direction of the tangent at the axis of pedal shaft 1 to the rotary path K thereof regardless of the position of crank arm 10 in revolution.

In other words, the pedal, even when positioned at the treading side slightly ahead of the upper dead point $O_1$ as shown in FIG. 4, can be applied with the treading force in the direction of the tangent to the rotary path K of the pedal shaft axis. While, when at the lower dead point $O_2$ the pedal can be easily raised therefrom by the cyclist's toes bearing against the third foot bearing surface 25.

As clearly understood from the aforesaid description, the pedal of the invention is provided at the pedal body with a forward extension having the third foot bearing surface, so treading force may be applied from the pedal shaft to the pedal body through the foot bearing surface always in the direction of the tangent to the rotary path of the pedal shaft axis, whereby the treading force can always be effectively transmitted to the pedal regardless of the position thereof. Furthermore, when at the lower dead point the pedal can be easily raised therefrom by use of the treading force from the cyclist's toes contacting the third foot bearing surface. Also, the first and second foot bearing surfaces are displaced downwardly with respect to the axis of pedal shaft, whereby the respective foot bearing surfaces, while the third foot bearing surface is formed, are maintained to face always upward by use of the horizontal positioning characteristic of the pedal body.

While an embodiment of the invention has been shown and described, the invention is not limited to the specific construction thereof, which is merely exemplified in the specification rather than defined.

What is claimed is:

1. A bicycle pedal rotatably supported to a crank arm comprising a pedal shaft and a pedal body supported rotatably to said crank arm through said pedal shaft, said pedal body having a first foot bearing surface provided forwardly with respect to an extension line of the axis of said pedal shaft for receiving a root portion of a cyclist's toes, a second foot bearing surface provided rearwardly with respect to said extension line for receiving a ball portion of a cyclist's foot and a pedal body extension extending forwardly of said first foot bearing surface having at a front terminating end thereof a third foot bearing surface for receiving a tip portion of a cyclist's toes, said pedal body being displaced downwardly with respect to the axis of said pedal shaft so that said foot bearing surfaces always face upward, wherein said third foot bearing surface is positioned higher with respect to said first and second surfaces when a rear portion of said pedal body is horizontally positioned, and wherein when a rear portion of said pedal body is horizontally positioned, said second foot bearing surface slants forward and downwardly, said first foot bearing surface is positioned higher than said second foot bearing surface and slants forward and upwardly, and said third foot bearing surface slants forward and upwardly in the direction of inclination of said first foot bearing surface.

2. A pedal for a bicycle according to claim 1, wherein a distance between said extension line of the axis of said pedal shaft and a center longitudinal line of said second foot bearing surface and a distance between said extension line of the axis of said pedal shaft and a center longitudinal line of said third foot bearing surface are in the ratio range of 1 to 1.3 to 1 to 2.0.

3. A pedal for a bicycle as in claim 1, wherein said first and second and first and third foot bearing surfaces are separated by openings in said pedal body.

* * * * *